(12) United States Patent
Bonicatto (10) Patent No.: US 8,144,820 B2
(45) Date of Patent: Mar. 27, 2012

(54) SYSTEM AND METHOD FOR RELATIVE PHASE SHIFT KEYING

(75) Inventor: Damian Bonicatto, Pequot Lakes, MN (US)

(73) Assignee: Hunt Technologies, LLC, Pequot Lakes, MN (US)

( * ) Notice: Subject to any disclaimer, the term of this patent is extended or adjusted under 35 U.S.C. 154(b) by 622 days.

(21) Appl. No.: 12/347,052

(22) Filed: Dec. 31, 2008

(65) Prior Publication Data

US 2010/0164615 A1 Jul. 1, 2010

(51) Int. Cl.
*H03D 1/00* (2006.01)
(52) U.S. Cl. ........................................................ 375/343
(58) Field of Classification Search .................. 375/142, 375/143, 150, 152, 343; 704/216, 218, 237, 704/263; 708/5, 422, 813; 342/108, 145, 342/189, 378; 329/304
See application file for complete search history.

(56) References Cited

U.S. PATENT DOCUMENTS

| 6,101,214 | A | 8/2000 | Hershey et al. | |
|---|---|---|---|---|
| 6,292,760 | B1 | 9/2001 | Burns | |
| 7,593,449 | B2 * | 9/2009 | Shattil | 375/130 |
| 2003/0189893 | A1 | 10/2003 | Richardson | |
| 2005/0078735 | A1 * | 4/2005 | Baker et al. | 375/130 |
| 2009/0207889 | A1 * | 8/2009 | Kobayashi et al. | 375/142 |

OTHER PUBLICATIONS

International Search Report and Written Opinion for PCT/US2009/058148. Nov. 20, 2009.

* cited by examiner

*Primary Examiner* — Sam K Ahn
(74) *Attorney, Agent, or Firm* — Kilpatrick Townsend & Stockton LLP (57) ABSTRACT

Disclosed are various embodiments of systems and methods for relative phase shift keying. In one embodiment, an analog waveform is converted to digital signals. A specified frequency range is isolated and the magnitudes of tones corresponding to a channel are measured. The relative phase of a subset of the tones having the greatest magnitude is measured and a relative phase component is generated. At least one symbol is associated with the subset of tones and the relative phase component.

23 Claims, 7 Drawing Sheets

SYSTEM AND METHOD FOR RELATIVE PHASE SHIFT KEYING

TECHNICAL FIELD

The disclosure relates generally to software radio systems, and more specifically, to communications over distribution lines in a power distribution system.

BACKGROUND

In a power distribution system, usage metering data may be transmitted over a distribution line or a communications link to a power distribution substation, central office, billing center, or the like. Various modulation schemes may be employed between an endpoint and a distribution substation, central office, billing center, or the like.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are systems and methods for employing a relative phase shift keying (RPSK) modulation/demodulation scheme. A relative phase shift keying modulation scheme can complement a multiple frequency shift keying (MFSK) modulation scheme by allowing additional data to be encoded within a signal by utilizing the orthogonal tone spaces employed in a multiple frequency shift keying modulation scheme while additionally varying the phase of the transmitted tones. As a non-limiting example, in a two of nine multiple frequency shift keying modulation scheme employing channels having nine orthogonal tone spaces, RPSK can provide for additional data to be encoded within a given channel by varying the phases of the two tones relative to one another. Accordingly, additional bits or symbols of data can be associated with whether the phases of the two tones vary with respect to one another. In addition, additional bits or symbols of data can be associated with the degree to which the phases of the two tones vary relative to one another.

As a non-limiting example, as in a two of nine modulation scheme, symbols can be associated with the combination of two tones used from nine orthogonal tone spaces, RPSK can provide a third piece of data that can be varied in order to expand the possible symbols that can be encoded within a given channel of a signal. In an implementation of a two of nine MFSK modulation scheme that does not employ RPSK, thirty-six symbols can be supported due to the various combinations of two tones from among nine tone spaces. In one embodiment of a two of nine MFSK modulation scheme employing RPSK, at least seventy-two symbols can be supported because varying relative phases of the two tones provides an additional component of the signal that can be varied, thereby providing capacity to transmit additional data in an MFSK encoded signal.

In the above non-limiting example, phase information regarding the two tones can be compared at the end of a bit or symbol time, or upon completion of transmission. Despite the two tones having varying frequencies, the orthogonal nature of the tones allows phase variations to be introduced into the tones at transmission and substantially equivalent phase variations to be detected upon completion of transmission. In one embodiment, phase information regarding the two tones can be subtracted upon completion of transmission from one another to determine a relative phase component. If the two tones are in phase, or the relative phase component is approximately zero, then a first bit or symbol can be associated with the relative phase information of the two tones.

In other words, the first bit or symbol can be associated with a zero degree relative phase difference between the two tones. If the two tones are out of phase, or the relative phase component is non-zero, then a second bit or symbol can be associated with the relative phase information of the two tones. Moreover, additional symbols can be associated with relative phase components having various values. In one embodiment, if the relative phase component is approximately 180 degrees, then a second symbol can be associated with the relative phase information, while a relative phase component of approximately 90 degrees can be associated with a third symbol. Other similar combinations and permutations of the above scheme should be appreciated.

In addition, in MFSK modulation schemes involving the use of more than two tones (e.g., a three of ten MFSK scheme), additional symbols can be associated with various combinations and permutations of relative phase components among the tones as can be appreciated. In addition, the above described RPSK modulation scheme can complement other modulation schemes, which can include, but are not limited to: QAM, BPSK, CPFSK, MPSK, and others as can be appreciated. The above described RPSK modulation scheme can be differentiated from a differential phase shift keying modulation/demodulation scheme because in the RPSK scheme, phasing of tones sent within a particular channel in a given waveform are compared to arrive at a relative phase component. In contrast, in the differential phase shift keying modulation scheme, a reference tone is employed that can be separated in time from a tone being analyzed for phase information. In other words, the phase of a tone is compared to the phase of a previously sent tone.

According to various embodiments of the disclosure, data can be encoded on one or more of the waveforms of a multi-phase waveform. In addition various environmental, electrical, and other conditions can affect the quality of a waveform or introduce noise into a signal as it is transmitted from an origin to a destination. In addition, data can be segmented and/or bleed onto other waveforms of the multi-phase waveform. Accordingly, embodiments of the disclosure can combine the various waveforms comprising a multi-phase waveform into a single signal from which digital or analog data can be extracted at an endpoint. In one embodiment, the various waveforms can be summed to arrive at a single resultant waveform. In other embodiments, the three phases can be combined according to varying schemes with the resultant combinations sampled to determine which combination arrives at an optimal signal combination with a satisfactory signal to noise ratio.

Accordingly, to facilitate data transmission in such a system as well as employ relative phase shift keying modulation schemes, embodiments of the disclosure can also provide the flexibility to adjust the amplitude, phase, and/or other characteristics of the various waveform of a multi-phase waveform to arrive at an optimal signal combination of the various waveforms in order to increase the signal to noise ratio of a communications system incorporate such a waveform. It should be noted that three phase electric power is a common method of alternating current (AC) electric power transmission. Accordingly, a three phase waveform can be employed to transmit AC electric power from a distribution point to an endpoint, which can be a customer premises, a substation, etc. According to embodiments of the disclosure data can be encoded on one or more of the three wave forms comprising a three phase waveform to provide for data services, usage metering, control signal transmission, etc. While embodiments of the disclosure are discussed herein with reference to power distribution systems, it should be appreciated that the systems and methods disclosed can be employed in any software radio system and/or communications system.

Figure 1:
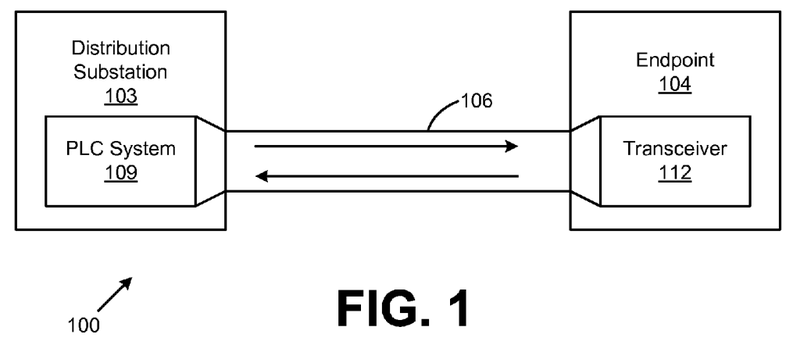
FIG. 1 depicts a distribution substation and an endpoint according to an embodiment of the disclosure.

Therefore, with reference to FIG. 1, shown is a block diagram of one link of an exemplary electrical distribution system 100 for distributing power between a distribution substation 103 and an endpoint 104, which can be incorporated with a customer device or electrical system at a power consumer's premises or site. An electrical distribution system 100, or distribution plant as it is sometimes referred to, is that part of an electric power system that receives power from a power generator via high-voltage transmission lines, reduces or steps down the voltage, and then distributes the power to an endpoint 104 at the premises of an energy customer. Within the electrical distribution system 100, distribution lines may conduct electricity from the distribution substation to the endpoints. Distribution lines may include underground cable, aerial cable, or overhead open-wire conductors carried on poles, or some combination of them.

There may be one or more layers of distribution substations 103 connected in series between the power generation and the endpoint 104, where each consecutive distribution substation further steps down the voltage of the transmitted electricity. Additionally, the depicted distribution substation 103 can also represent any other central office, data center, and/or other supplier infrastructure used to deliver electricity, telecommunications services, phone, internet, or other services as should be appreciated.

Additionally, the power generators, distribution substations, and endpoints may be organized in a network where various generators supplying power can be taken on or off line and the distribution substation through which a particular endpoint receives its electricity can be changed, all without a loss or interruption of power. Distribution transformers (not shown) may be connected in the distribution line between the distribution substation 103 and the endpoint 104, which the distribution transformers serve to further step-down the voltage to a level that is used by consumers. These step-down transformers, often referred to as pole transformers, supply a consumer or group of consumers over a secondary circuit. Each consumer is connected to the secondary circuit through its service leads and meter.

The distribution substation 103 shown in FIG. 1 may be configured to provide power to a customer device (not shown) or endpoint 104 via a communications link 106, which can also be referred to as a distribution line. The communications link 106 may be coupled to one or more step-down transformers before reaching the depicted endpoint 104. The communications link 106 may be configured to provide power from the distribution substation 103 to the endpoint 104. For a variety of reasons, it may be desirable to communicate information from the distribution substation 103 to one or more endpoints, such as an endpoint 104. As a non-limiting example, it may be desirable to meter, control or monitor usage data of the endpoint 104 to determine the power consumption at the endpoint 104. Additionally, control information could provide the ability to control or alter the operation of such an exemplary usage metering device and/or individual loads at the customer premise. As an additional non-limiting example, other services aside from power, such as telecommunications, internet, and/or other data services can also be provided via the distribution line and may utilize bidirectional communication between the distribution substation 103 and endpoint 104. In order to receive control information such as metering data or data from other data services in the distribution substation 103, the PLC transceiver 109 can be employed to recognize the signals transmitted by an endpoint transceiver 112.

Other more general information, including, but not limited to, information to display or store the price of power at the customer premise, the date and time, the temperature and/or other information capable of being received and translated at the customer premise may also be transmitted along the distribution line. For example, the time displayed on an electronic device at the customer premise could be periodically adjusted to display an accurate time as transmitted by the utility station.

Various embodiments disclosed herein may be configured to communicate control signals and general information signals to endpoints 104 via the communications link 106 to control customer devices and provide more general information to the customer. Information from the customer device also may be sent via the communications link 106 to the distribution substation 103, thereby creating a two-way or bidirectional communications link 106. The aforementioned examples of control signal applications where control signals (and/or general information signals) are provided by the distribution substation to an endpoint 104 are merely representative of the various uses that such control signals provide. Therefore, the examples provided throughout the application are merely exemplary, as the invention is not limited to the transmission of any particular signal or service. In addition, embodiments of the disclosure can be implemented in any software radio system, and are not limited to the depicted environment of a power distribution system.

As three phase electronic power systems can be frequently employed for power distribution, such power systems can include three conductors carrying time offset waveforms. Accordingly, data can be transmitted via three substantially similar waveforms that can be reconciled by a transceiver, and/or data can be separately transmitted in each of the three waveforms. It should also be appreciated that a single phase waveform or combinations of any number of wave forms can be employed as well. Data can be embedded in any or all of the waveforms by the relative phase shift keying modulation scheme described herein, whereby digital information can be transmitted on any or all of the waveforms employed in a power distribution system that may act as a carrier wave in such a scheme.

The electrical distribution system 100 including the communications link 106 and depicted in FIG. 1 therefore, may be configured to provide a full-duplex or bidirectional link between the distribution substation 103 and the endpoint 104. Full duplex in this non-limiting example may refer to simultaneous (and/or substantially simultaneous) communications in both directions, although the information sent in one direction may travel at a speed different from that of the information provided in the opposite direction. This full-duplex link via the communications link 106 may be configured to provide for transmission of control information, without the need for additional wiring over and above such wiring that is necessary for the transmission of electrical power.

It should be appreciated that the depicted power distribution system 100 of FIG. 1 is merely a depiction of a single exemplary link in such a system. It should further be appreciated that additional complexities utilized for the bulk distribution of electricity or other services can be incorporated into an embodiment of the present disclosure. It should also be appreciated that systems and methods disclosed herein may not be limited to use in a power distribution system 100, and that the depicted power distribution system 100 is but one example in which embodiments of the disclosure can be implemented. For example, systems and methods of an embodiment can be implemented in a software radio system other system employing the relative phase shift keying modulation scheme according to an embodiment of the disclosure.

Figure 2:
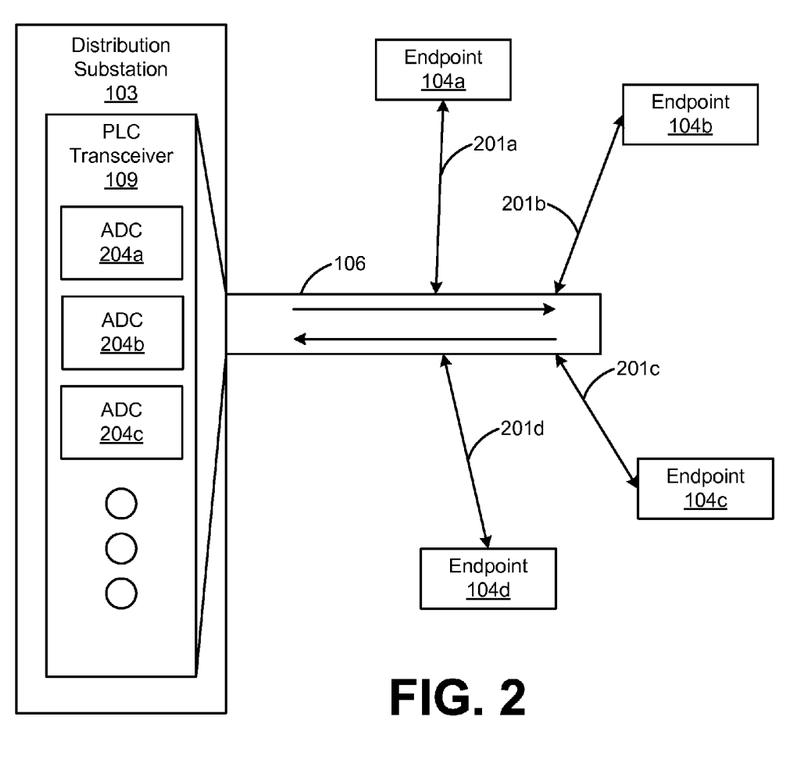
FIG. 2 depicts another exemplary embodiment of a distribution substation and an endpoint.

With reference to FIG. 2, shown is an alternative depiction of a distribution substation 103 in accordance with the disclosure. It should be noted, as is depicted in FIG. 2, that in operation, a distribution substation 103 can be coupled to more than one endpoint 104. As a non-limiting example, a distribution substation 103 may be coupled to hundreds or thousands of endpoints 104 configured in a unidirectional or bidirectional communications link 106. It should also be noted that in a multiple endpoint 104 configuration, various wiring configurations can be employed to connect a distribution substation 103 to endpoints 104. As a non-limiting example, in the depicted environment of FIG. 2, a main communications link or distribution line as well as various spoke distribution lines 201 are employed to connect endpoints 104 to the distribution substation 103. However, alternative wiring schemes may also be employed. As an additional non-limiting example, the distribution substation 103 as well as endpoints 104 may be connected serially.

As the distribution substation 103 and multiple endpoints 104 can be configured to form a communication link 106, a communications protocol can be established to substantially ensure that signals originating from one endpoint 104a do not interfere with those originating from another endpoint 104b. Accordingly, each endpoint 104 in such an environment can be assigned a channel in a frequency modulation scheme in which it may transmit data. As a non-limiting example, an endpoint 104 can be assigned an approximate 2-3 MHz channel within approximately 50 Hz to 60 Hz of bandwidth that is typically employed for power distribution.

Accordingly, the PLC transceiver 109 can communicate with each endpoint 104 individually by sending and/or receiving signals in a particular channel or frequency assigned to an endpoint 104. As noted above, there may be hundreds or thousands of endpoints 104 coupled to a distribution substation 103. A PLC transceiver 109 in accordance with embodiments of this disclosure are capable of interpreting and processing data that may be sent from multiple endpoints 104 according to a relative phase shift keying modulation scheme described herein. Such processing of a three phase analog waveform can utilize substantial digital signal processing resources. Accordingly, the PLC transceiver 109 may include at least one advanced digital signal processing card (ADC) 204, which is configured to receive the three offset phases of a three phase signal from various endpoints 104 that are coupled to the distribution substation 103 or a subset thereof. The ADC 204 may be configured to receive, filter, and/or separate a predetermined frequency range (e.g. approximately a 60 Hz and/or 50 Hz range) into one or more channels that are assigned to various endpoints 104.

In one embodiment, the ADC 204 can include one or more digital signal processors that are configured to receive and/or process channels assigned to endpoints 104 that are encoded in an analog waveform. A decoder can be implemented in one or more digital signal processors on an ADC 204 in order to decode a signal encoded according to the RPSK scheme. In addition, a correlator can also be implemented to facilitate demodulation of a signal by the decoder. As another non-limiting example, an ADC 204 can include a plurality of digital signal processors that can receive the various phases of a waveform embedded with encoded data from a plurality of endpoints 104 and extract at least one channel of data corresponding to the various endpoints 104 in a multi-processor environment. The RPSK scheme employed to extract such channels of digital data from an analog waveform will be discussed in further detail hereinbelow.

A PLC transceiver 109 can include one or more ADC's 204 to perform digital signal processing to receive and/or process signals received from other and/or additional endpoints 104. As a non-limiting example, the distribution substation 103 and PLC transceiver 109 may be coupled to a number of endpoints 104 that is greater than can be handled by a single ADC 204; therefore, additional ADCs 204 may be incorporated into a PLC transceiver 109.

Figure 3:
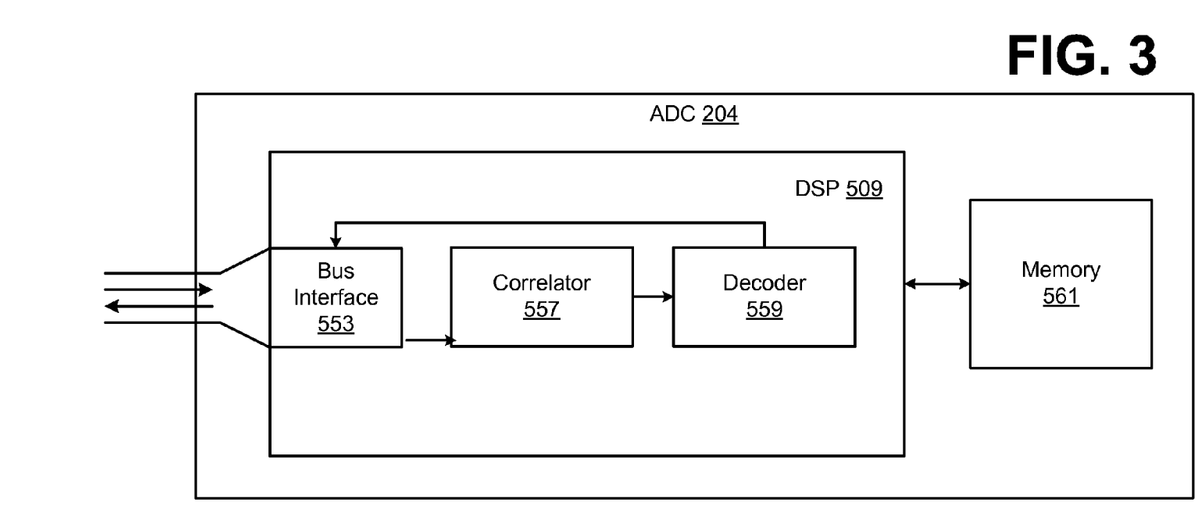
FIG. 3 depicts an exemplary embodiment of a digital signal processor implementing a decoder and/or correlator according to an embodiment of the disclosure.

With reference to FIG. 3, shown is one example of an ADC 204 according to one embodiment of the disclosure. The depicted ADC 204 can include one or more digital signal processors configured to receive a signal from a communications link 106 (FIG. 1) and demodulate an RPSK encoded signal. The ADC 204 can also include other components not shown, including, but not limited to: analog-to-digital converters or other components that should be appreciated. Such components are omitted for ease of depiction and are not necessary for an understanding of the various embodiments of the disclosure.

Accordingly, the depicted DSP 509 can exist in the depicted ADC 204 as well as any computing system and as a standalone signal decoder. The DSP 509 can include a bus interface 353 that provides access to a data bus, shared memory system, master processor, slave processor, transmission line, communication medium, or other resources of the ADC 204. The DSP 509 can further be configured to implement a correlator 557 and a decoder 559 according to an embodiment of the disclosure. The DSP 509 can also optionally be configured with a dedicated memory 561 structure in which signal magnitude tables, symbol lookup tables, or other data structures can be stored and/or accessed.

The ADC 204 is configured to receive a waveform on a communications link 106 that is converted into digital signals by an analog to digital converter. In the case of a three phase waveform, an analog to digital converter can be configured to receive three phases and convert the phases into a digital signal for processing by the ADC 204 and/or the DSP 509 or other DSP's within the ADC 204. DSP 509 can perform various digital signal processing tasks to begin the channel extraction process. As a non-limiting example, the DSP 509 can combine the three phases of the three phase waveform and filter the combined waveform such that extraneous data at frequencies above and below an area of interest are removed. As a non-limiting example, in a 60 Hz power distribution system, frequencies above and below a 60 Hz area of interest can be filtered from the combined waveform by DSP 509 so that channels can be extracted therefrom. Likewise, the same principle can be applied in a 50 Hz power distribution system, as frequencies above and below a 50 Hz area of interest can be filtered from the combined waveform.

In the depicted example, the DSP 509 in the ADC 204 can implement a correlator 557 and signal decoder 559 to extract data from channels in a waveform received by the ADC 204 encoded employing an RPSK modulation scheme. The correlator can measure various characteristics of tones in a preprocessed waveform and store the characteristics of each tone in a table. These characteristics can include, but are not limited to the amplitude, phasing, frequency, and other characteristics that should be appreciated. In one embodiment, the correlator can measure the magnitude and/or amplitude of each tone in a waveform and store the magnitudes and/or amplitudes in a signal magnitude table in the memory 561. In addition, the correlator can also detect the relative phasing of tones associated with a received signal. For example, the correlator can detect the phase of two tones in a two of nine MFSK modulation scheme relative to one another. In this example, the correlator can detect whether the two tones are in phase (e.g., a zero degree relative phase difference or little or no difference in the phasing of the two tones). As an additional example, the correlator can detect the degree to which the two tones vary in phase by subtracting a measure of the phasing of the two tones. The correlator 557 can measure phasing of the tones as well as a variation between the tones due to their orthogonal nature. In other words, due to the orthogonal nature, phasing variations introduced at transmission time can be consistently detected upon completion of transmission.

Accordingly, information regarding signal magnitudes and relative phasing of tones can be processed by the decoder 559 to extract bits and/or symbols encoded in the waveform from various channels of the waveform. By employing the RPSK scheme discussed herein, information can be encoded by varying the magnitude of various tones in a signal as well as varying the phasing of the tones relative to one another. To accomplish the above, the decoder can decode the various channels of data encoded in the waveform by processing a signal magnitude table reflecting the magnitudes of various tones within the signal. In one embodiment, upon selection of a plurality of tones having the greatest signal magnitude and/or amplitude, the decoder 559 can also compare the relative phase of tones having the greatest magnitude in a particular channel, which can allow additional data to be encoded in a given signal. To facilitate the above example, the correlator 557 can determine a relative phase component associated with the tones.

The above noted RPSK modulation scheme can be employed to complement multiple frequency shift keying or other modulation schemes by allowing additional bits or symbols of data to be encoded within a given signal, thereby increasing the potential bandwidth of a system employing RPSK. In a non-limiting example of a two of nine modulation scheme, where two tones are used within nine orthogonal tone spaces, a total of thirty-six symbols can be transmitted without employing the RPSK scheme. By complementing a non-limiting exemplary two of nine modulation scheme with RPSK, at least seventy-two different symbols can be transmitted within nine orthogonal tone spaces. In other words, employing relative phase difference of the two tones of interest can allow at least one additional bit or symbol to be encoded within a given channel, which (in the above example) can increase the bandwidth of the system without requiring additional tone spaces. In addition, in some embodiments, tones employed in an MPSK scheme can represent a first symbol, and the relative phase component can represent a second symbol.

Figure 4:
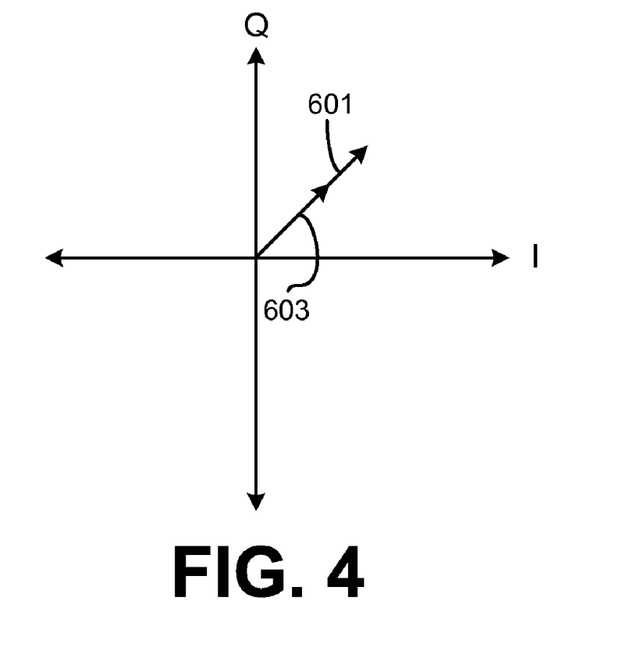
FIG. 4 depicts relative phase information of tones in an exemplary embodiment of the disclosure.

To further illustrate the above-described RPSK modulation scheme, reference is now made to FIG. 4. Shown is one non-limiting example of phase information of two tones 601, 603 of a non-limiting exemplary two of nine MFSK channel employing RPSK. A correlator 557 (FIG. 3), in addition to examining signal magnitudes associated with the nine orthogonal tone spaces in a two of nine modulation scheme, can examine relative phase information of the two tones to determine a relative phase component. In the depicted example of FIG. 4, the two tones are in phase (e.g., a relative phase component of zero degrees). Accordingly, a decoder 559 (FIG. 3) can utilize tones' placement in a given channel as well as the relative phase component in order to generate a symbol associated therewith. In one embodiment, a zero or one can be associated with a relative phase component of zero degrees, thereby providing an additional bit of data that may be encoded in a channel without the need for an additional tone space in the channel.

Figure 5:
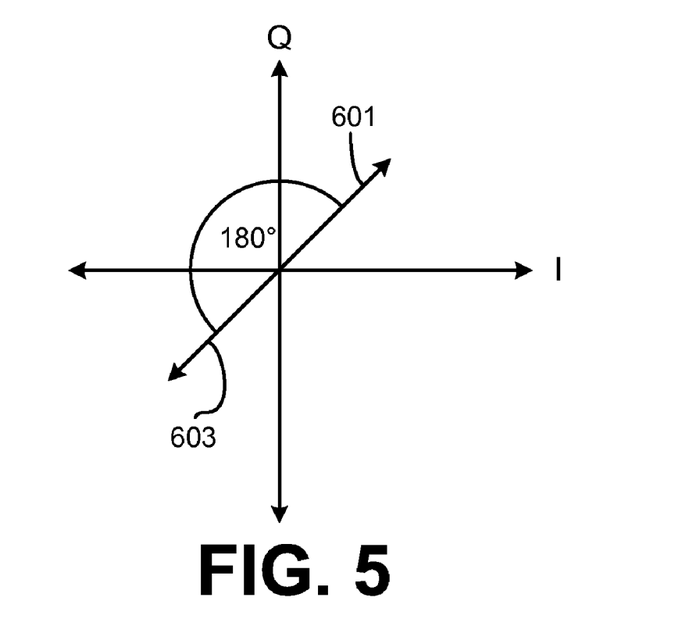
FIG. 5 depicts relative phase information of tones in an exemplary embodiment of the disclosure.

Continuing the above example of FIG. 4, reference is now made to FIG. 5, which depicts different exemplary phase information of two tones 601, 603 in a two of nine MFSK channel employing RPSK. In the depicted non-limiting example, the tones 601, 603 have a relative phase component of one hundred eighty degrees. Accordingly, relative to the example of FIG. 5, a different bit can be associated with the relative phase component of the tones 601, 603. It should be noted that in the above example, the tones 601, 603 can be extracted from the same tone spaces of a nine tone channel.

Figure 6:
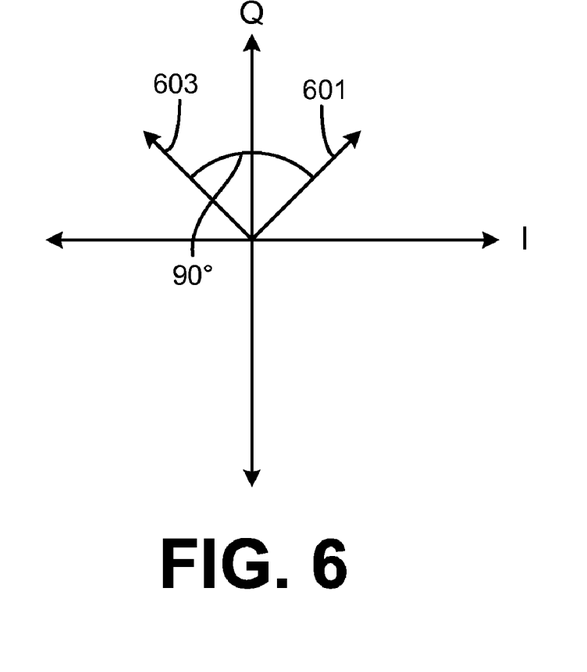
FIG. 6 depicts relative phase information of tones in an exemplary embodiment of the disclosure.

Reference is now made to FIG. 6, which depicts an additional non-limiting example of exemplary phase information of two tones 601, 603 in a two of nine MFSK channel employing RPSK. In the depicted non-limiting example, the tones 601, 603 have a relative phase component of ninety degrees. Accordingly, relative to the above examples of FIGS. 4 and 5, a symbol representing more than one bit can be associated with the relative phase component of the tones 601, 603. In other words, the decoder 559 can associated a first symbol with a relative phase component of ninety degrees, and a second symbol with a relative phase component of one hundred eighty degrees. Symbol lengths of increasing size can be employed in such a fashion depending on a desired level of sensitivity with regard to generating a relative phase component. For example, in a communication system having high noise levels or low signal quality, it may be desired to limit the relative phase component to a limited set of possibilities to reduce the chances of improperly detecting a relative phase component.

Figure 7:
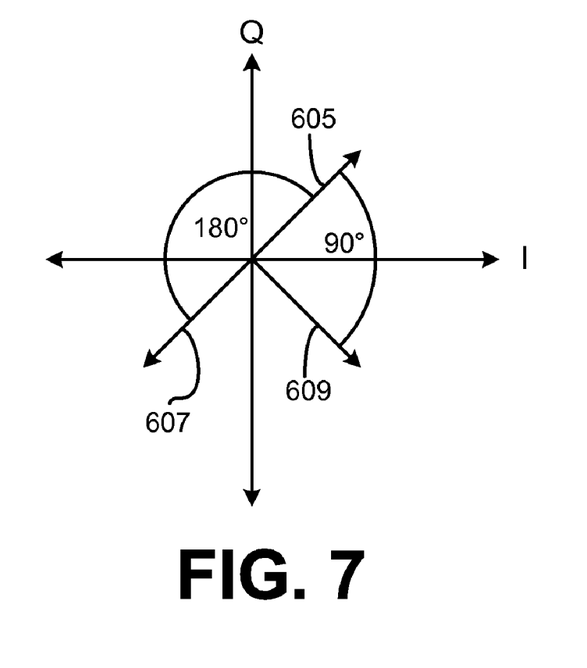
FIG. 7 depicts relative phase information of tones in an exemplary embodiment of the disclosure.

Reference is now made to FIG. 7, which depicts an additional non-limiting example of exemplary phase information of three tones 605, 607, 609 in a three of ten MFSK channel.

In the depicted example, the three tones of interest can have varying phase information that can be detected by the correlator 557 (FIG. 3). Accordingly, relative phase components can be calculated with respect to the three tones 605, 607, 609 with respect to one another, and a symbol associated with the various possible combinations of phase variations as can be appreciated.

Figure 8:
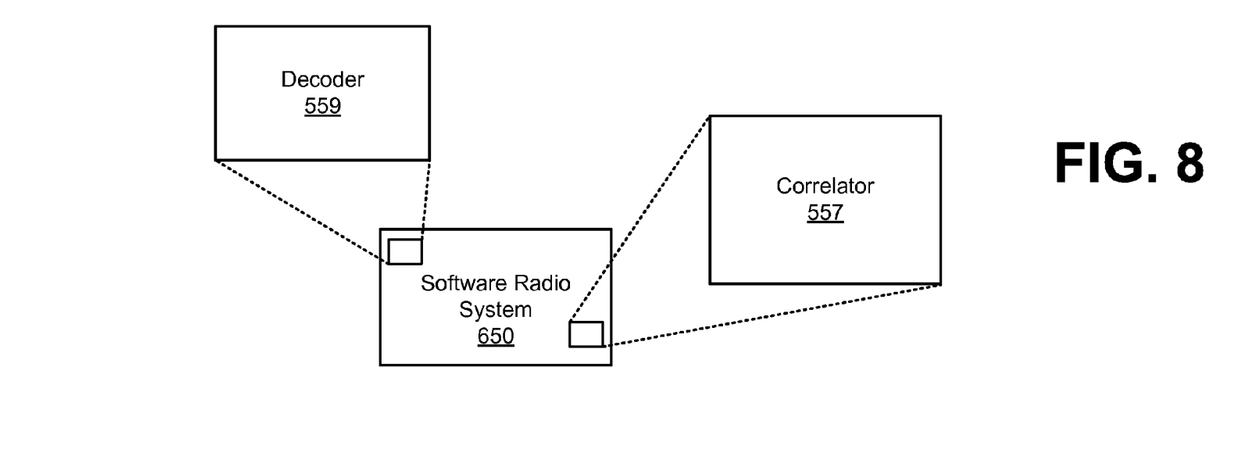
FIG. 8 depicts a functional block diagram of a software radio system in accordance with an embodiment of the disclosure.

Reference is now made to FIG. 8, which depicts a functional block diagram of a software radio system 650. It should be noted that some components not essential for understanding (by persons skilled in the art) of the software radio system 650 are omitted for purposes of brevity and ease of depiction. The software radio system 650 can be implemented as a software program in a computing system for the purposes of transmitting and/or receiving data signals encoded in one or more waveforms.

The software radio system 650 can include an implementation of a correlator 557 and decoder 559 as described above with respect to previous embodiments. As described above with reference to previously disclosed embodiments of the disclosure, the correlator 557 is configured to preprocess a data signal on behalf of a decoder 559. In one embodiment, the correlator 557 can detect the magnitude and/or energy level of various tones in a waveform and store the magnitudes in a signal magnitude table. Accordingly, as described above, the decoder 559 can decode the various channels encoded in the waveform by employing RPSK.

Figure 9:
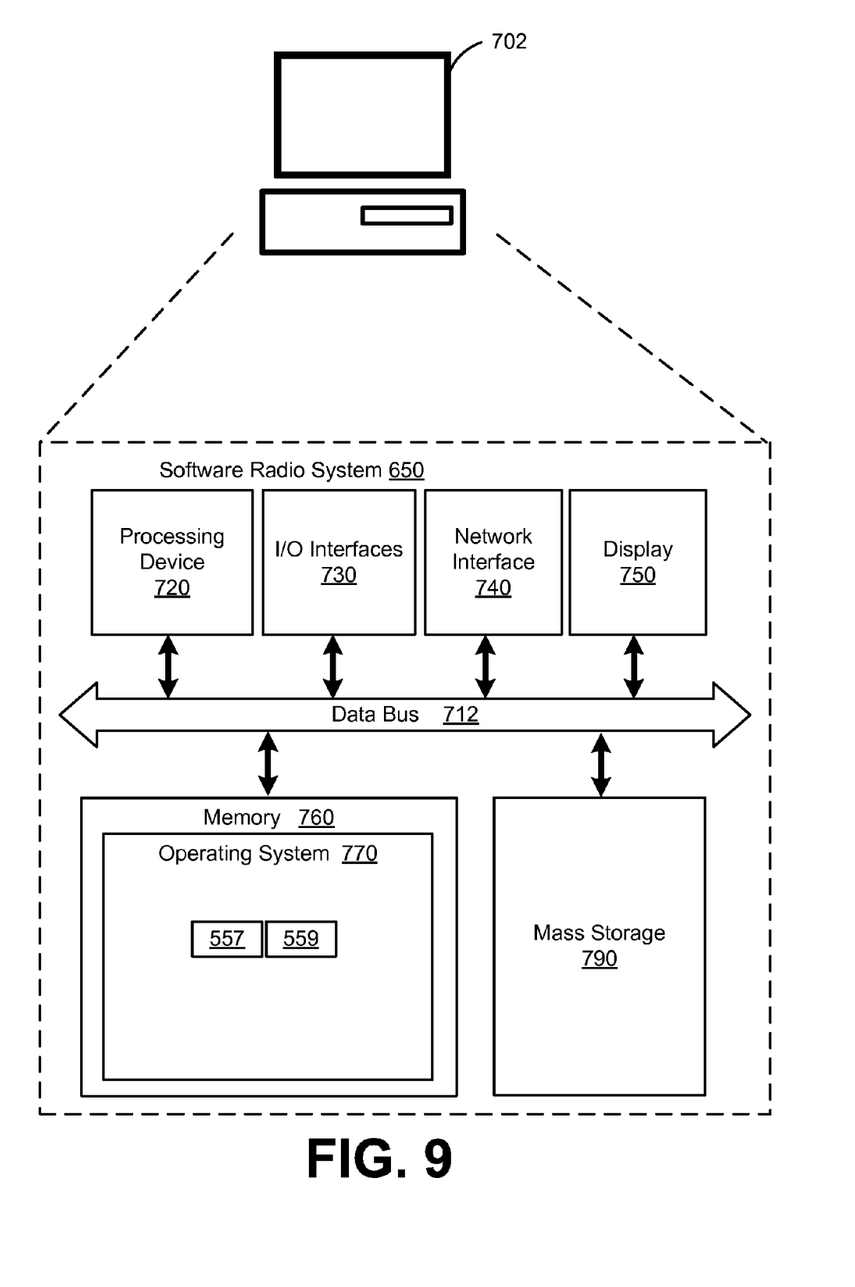
FIG. 9 depicts a functional block diagram of a software radio system in accordance with an embodiment of the disclosure.

Reference is now made to FIG. 9, which is an exemplary embodiment of the software radio system 650 in which the above described RPSK modulation/demodulation scheme can be implemented. For some embodiments, the software radio system 650 may be incorporated as some type of computing device. Generally speaking, the software radio system 650 may be any one of a wide variety of wired and/or wireless computing devices, such as an embedded system, digital signal processing system, desktop computer, portable computer, dedicated server computer, multiprocessor computing device and so forth. Irrespective of its specific arrangement, the software radio system 650 may comprise, among other components, a processing device 720, input/output interfaces 730, a network interface 740, and, optionally, a display 750 connected across a data bus 712. One of ordinary skill in the art will appreciate that the software radio system 650 can, and typically will, comprise other components, which have been omitted for purposes of brevity.

The processing device 720 can include a custom-made or commercially available processor, a central processing unit (CPU) or an auxiliary processor among several processors associated with digital signal processing, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 760 shown in FIG. 9 can include any one of a combination of volatile memory elements (e.g., random-access memory RAM, such as DRAM, and SRAM, etc.) and nonvolatile memory elements (e.g., ROM, hard drive, tape, CDROM, flash memory, etc.). The memory 760 may store a native operating system 370, one or more native applications, emulation systems, or emulated applications for any of a variety of operating systems and/or emulated hardware platforms, emulated operating systems, etc. Again, one of ordinary skill in the art will appreciate that the memory 760 can, and typically will, comprise other components, which have been omitted for purposes of brevity. The software radio system 650 may further comprise mass storage 790. The mass storage 790 may be, for example, a disk drive, flash memory, or any other of a wide variety of storage devices capable of storing data.

As noted in the functional block diagram of FIG. 8, the software radio system 650 may include an implementation of a correlator 557 and decoder 559, the functionality of which are described herein. When implemented in software, it should be noted that any of the above modules can be stored on a variety of computer-readable medium for use by, or in connection with, a variety of computer-related systems or methods. In the context of this document, a computer-readable medium may comprise electronic, magnetic, optical, or other physical device or apparatus that can contain or store a computer program for use by or in connection with a computer-related system or method. The interface can be embedded in a variety of computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this disclosure, a "computer-readable medium" stores, communicates, propagates, or transports the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), a portable compact disc read-only memory (CDROM) (optical), a digital versatile disc (optical), a high definition digital versatile disc (optical), and a Blu-ray Disc (optical).

Input/output interfaces 730 comprise any number of interfaces for the input and output of data. For example, where the software radio system 650 comprises a personal computer, the components within the system may interface with a user input device such as a keyboard, a mouse, or a remote controller. In addition, the software radio system 650 may communicate via the input/output interfaces 730 with an antenna, radio system, communication line, or other communication medium for the purposes of receiving and/or sending a data signal. The software radio system 650 may also include a network interface 740 for transmitting and/or receiving data over a network. As a non-limiting example, the network interface 740 may include a modulator/demodulator (e.g., a modem), wireless (e.g., radio frequency (RF)) transceiver, a telephonic interface, a bridge, a router, network card, etc.

Figure 10:
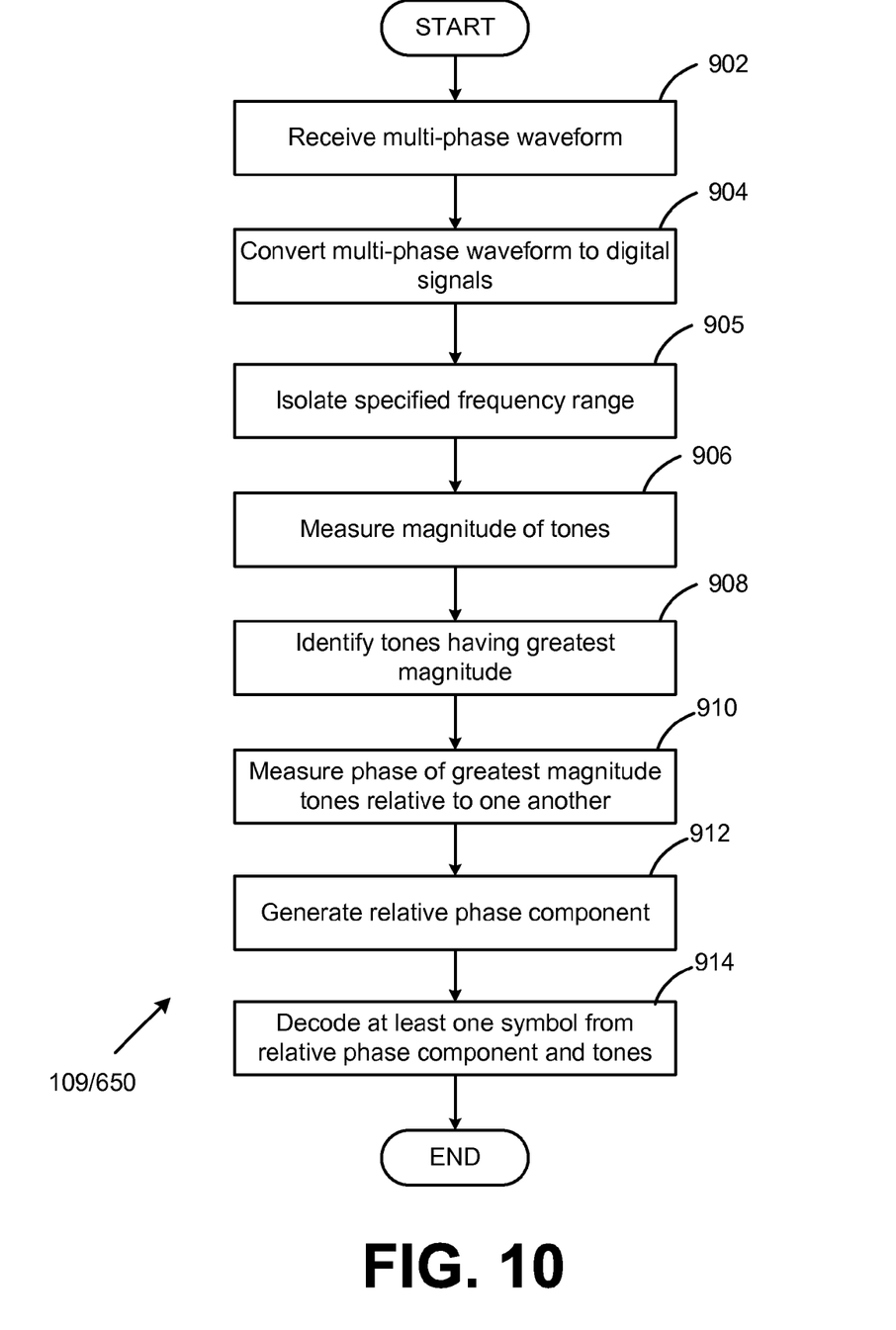
FIG. 10 depicts an exemplary embodiment of a process in accordance with the disclosure.

With reference to FIG. 10, shown is one example of a process according to one embodiment of the disclosure. The depicted process illustrates operation of a transceiver 109 (FIG. 1) and/or a software radio system 650. The depicted process can be implemented in a computing system and/or digital signal processing system. In box 902, a multi-phase waveform is received. As noted above, in a power distribution system, a three phase waveform can be used to transmit AC electricity, and a data signal can be encoded on the three phase waveform. In one embodiment, the multi-phase waveform can be separated into a plurality of analog waveforms. In the case of a three phase waveform, the three phase waveform can be separated into three analog waveforms.

In box 904, the analog waveforms are converted into digital signals corresponding to the analog waveforms. In box 905, a specified frequency range is isolated. The specified frequency range can correspond to a channel. In box 906, the magnitude and/or amplitude of tones corresponding to a channel is measured. The magnitude and/or amplitude of tones corresponding to a channel can be stored in a signal attribute table. In box 908, a subset of tones in the channel having the greatest magnitude are identified.

In box 910, the phase of the subset of tones is measured relative to one another. As a non-limiting example, in a two of nine MFSK scheme, the two tones having the greatest magnitude are identified, and the phase of the two tones relative to one another are measured. In box 912, a relative phase component expressing a measure of the phase difference between the subset of tones identified in box 908 is generated. In box 914, at least one symbol can be decoded from the identified tones and the relative phase component. In one embodiment, a first symbol can be decoded from the subset tones and a second symbol can be decoded from the relative phase component. In another embodiment, a single symbol can be decoded from a combination of the subset of tones and the relative phase component. Other permutations and combinations should be appreciated.

Figure 11:
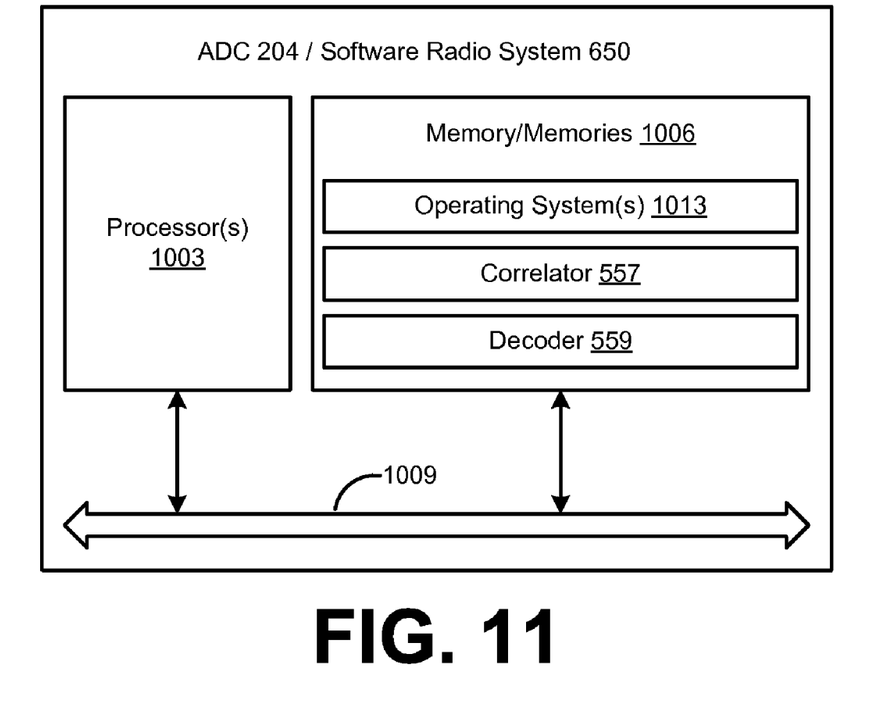
FIG. 11 depicts an exemplary embodiment of an advanced digital signal processing card and/or software radio system in accordance with the disclosure.

With reference to FIG. 11, shown is one additional example of an ADC 204 and/or software radio system 600 implementing a correlator 557 and/or decoder 559 that includes an embedded system, one or more digital signal processors, computer, and/or equivalent device according to an embodiment of the present disclosure. In implementing the above described embodiments, the ADC 204 and/or software radio system 650 implementing a correlator 557 and decoder 559 employing RPSK may include one or more processor circuits having a processor 1003, and a memory 1006, which are coupled to a local interface or bus 1009. In this respect, the local interface or bus 1009 may comprise, for example, a data bus with an accompanying control/address bus as can be appreciated.

Stored on the memory 1006 and executable by the processor 1003 are various components such as an operating system 1013. In addition, it is understood that many other components may be stored in the memory 1006 and executable by the processor(s) 1003, such as the correlator 557 and decoder 559 for employing RPSK. Also, such components may reside in a memory that is external from the distribution substation 103 as can be appreciated. It should also be noted that DSP(s) in an ADC 204, for example, may also include additional ports that for additional external connectivity, memory interfaces, or other ports that are not shown as they are not necessary for an appreciation of the disclosed ADC 204 architecture.

As set forth above, a number of components are stored in the memory 1006 and are executable by the processor 1003. In this respect, the term "executable" refers to a program file that is in a form that can ultimately be run by the processor 1003. Examples of executable programs may be, for example, a compiled program that can be translated into machine code in a format that can be loaded into a random access portion of the memory 1006 and run by the processor 1003, or source code that may be expressed in proper format such as object code that is capable of being loaded into a random access portion of the memory 1006 and executed by the processor 1003. An executable program may be stored in any portion or component of the memory 1006 including, for example, random access memory, read-only memory, a hard drive, compact disk (CD), floppy disk, or other memory components.

The memory 1006 is defined herein as volatile and/or nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 1003 may represent multiple processors and the memory 1006 may represent multiple memories that operate in parallel. In such a case, the local interface 1009 may be an appropriate network that facilitates communication between any two of the multiple processors, between any processor and any one of the memories, or between any two of the memories, etc. The processor 1003 may be of electrical, optical, or of some other construction as can be appreciated by those with ordinary skill in the art.

The operating system 1013 is executed to control the allocation and usage of hardware resources such as the memory and processing time in the ADC or software radio system. In this manner, the operating system 1013 serves as the foundation on which applications depend as is generally known by those with ordinary skill in the art.

The flow chart of FIG. 10 shows the functionality and operation of an implementation of an ADC 204 and/or software radio system 650 implementing a decoder 559 and correlator 557. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 10 shows a specific order of execution, it is understood that the order of execution may differ from that which is depicted. For example, the order of execution of two or more blocks may be scrambled relative to the order shown. Also, two or more blocks shown in succession in FIG. 9 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the functionality of the disclosed systems is expressed in the form of software or code, it can be embodied in any computer-readable medium for use by or in connection with an instruction execution system such as, for example, a processor in a computer system or other system. In this sense, the functionality may comprise, for example, statements including instructions and declarations that can be fetched from the computer-readable medium and executed by the instruction execution system.

Although the functionality of various embodiments are described above with respect to the drawings as being embodied in software or code executed by general purpose or digital signal processing hardware as discussed above, as an alternative the same may also be embodied in dedicated hardware or a combination of software/general purpose hardware and dedicated hardware. If embodied in dedicated hardware, the functionality of these components can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, the following is claimed:

1. A method comprising:
   receiving an analog waveform;
   converting the analog waveform to at least one digital waveform isolating a specified frequency range from the at least one digital waveform;
   measuring a magnitude of a first plurality of tones within the specified frequency range;
   identifying a subset of the first plurality of tones having the greatest magnitude relative to a remainder of the first plurality of tones;
   measuring a phase of each tone of the subset relative to other tones of the subset;
   generating a relative phase component from the measured phase of each tone of the subset relative to other tones of the subset; and
   decoding at least one symbol from the subset of tones and the relative phase component.

2. The method of claim 1, wherein the relative phase component corresponds to at least one additional bit of digital data encoded within the analog waveform.

3. The method of claim 1, wherein the step of measuring a phase of each tone of the subset relative to other tones of the subset further comprises the step of measuring a phase offset between a first tone of the subset and a second tone of the subset.

4. The method of claim 1, wherein the step of generating a relative phase component from the measured phase of each tone of the subset further comprises the step of associating a first bit with the relative phase component if a first measured phase of a first tone of the subset is substantially similar to a second measured phase of a second tone of the subset.

5. The method of claim 4, wherein the step of generating a relative phase component from the measured phase of each tone of the subset further comprises the step of associating a second bit with the relative phase component if the first measured phase of the first tone of the subset is different from the second measured phase of the second tone of the subset.

6. The method of claim 4, wherein the step of measuring a phase of each tone of the subset relative to other tones of the subset further comprises the step of subtracting a first measured phase of the first tone from a second measured phase of the second tone of the subset.

7. The method of claim 1, wherein the step of generating a relative phase component from the measured phase of each tone of the subset further comprises the step of associating a symbol with a combination of the measured phase of each tone of the subset relative to one another.

8. The method of claim 1, wherein the step of decoding at least one symbol from the subset of tones and the relative phase component further comprises the step of retrieving a symbol from a symbol lookup table, the symbol lookup table indexed by a value associated with a combination of the subset of the plurality of tones and the relative phase component.

9. The method of claim 1, wherein the step of decoding at least one symbol from the subset of tones and the relative phase component further comprises the step of associating a first symbol with the subset and associating a second symbol with the relative phase component.

10. A software radio system, comprising:
   a signal receiver configured to receive at least one analog waveform;
   at least one processor configured to isolate a specified frequency range from the at least one analog waveform;
   a correlator configured to measure a magnitude of a first plurality of tones within the specified frequency range, identify a subset of the first plurality of tones having the greatest magnitude relative to a remainder of the first plurality of tones, and measure a phase of each tone of the subset relative to other tones of the subset;
   wherein the at least one processor generates a relative phase component from the measured phase of each tone of the subset relative to other tones of the subset and decodes at least one symbol from the subset of tones and the relative phase component.

11. The system of claim 10, wherein the relative phase component corresponds to at least one additional bit of digital data encoded within the analog waveform.

12. The system of claim 10, wherein the correlator is further configured to measure a phase offset between a first tone of the subset and a second tone of the subset.

13. The system of claim 10, wherein the at least one processor generates a relative phase component from the measured phase of each tone by associating a first bit with the relative phase component if a first measured phase of a first tone of the subset is substantially similar to a second measured phase of a second tone of the subset.

14. The system of claim 13, wherein the at least one processor is further configured to generate a relative phase component from the measured phase of each tone of the subset by associating a second bit with the relative phase component if the first measured phase of the first tone of the subset is different from the second measured phase of the second tone of the subset.

15. The system of claim 13, wherein the correlator measures a phase of each tone of the subset relative to other tones of the subset by subtracting a first measured phase of the first tone from a second measured phase of the second tone of the subset.

16. The system of claim 10, wherein the at least one processor is further configured to generate a relative phase component from the measured phase of each tone of the subset by associating a symbol with a combination of the measured phase of each tone of the subset relative to one another.

17. The system of claim 10, wherein the at least one processor is further configured to decode the at least one symbol from the subset of tones and the relative phase component by retrieving a symbol from a symbol lookup table, the symbol lookup table indexed by a value associated with a combination of the subset of the plurality of tones and the relative phase component.

18. The system of claim 10, wherein the at least one processor is further configured to decode the at least one symbol from the subset of tones and the relative phase component by associating a first symbol with the subset and associating a second symbol with the relative phase component.

19. A non-transitory computer readable medium comprising a program for decoding a multi-phase waveform, the program when executed by a processor causing the processor to perform the steps:
receiving an analog waveform;
converting the analog waveform to at least one digital waveform isolating a specified frequency range from the at least one digital waveform;
measuring a magnitude of a first plurality of tones within the specified frequency range;
identifying a subset of the first plurality of tones having the greatest magnitude relative to a remainder of the first plurality of tones;
measuring a phase of each tone of the subset relative to other tones of the subset;
generating a relative phase component from the measured phase of each tone of the subset relative to other tones of the subset; and
decoding at least one symbol from the subset of tones and the relative phase component.

20. The computer readable medium of claim 19, wherein the relative phase component corresponds to at least one additional bit of digital data encoded within the analog waveform.

21. The computer readable medium of claim 19, wherein the step of measuring a phase of each tone of the subset relative to other tones of the subset further comprises the step of measuring a phase offset between a first tone of the subset and a second tone of the subset.

22. The computer readable medium of claim 19, wherein the step of generating a relative phase component from the measured phase of each tone of the subset further comprises the step of associating a first bit with the relative phase component if a first measured phase of a first tone of the subset is substantially similar to a second measured phase of a second tone of the subset.

23. The method of claim 1, wherein measuring the magnitude of the first plurality of tones within the specified frequency range comprises measuring the magnitudes of nine tones used in a two-of-nine multiple frequency shift keying modulation scheme, and
wherein identifying the subset of the first plurality of tones having the greatest magnitude relative to the remainder of the first plurality of tones comprises identifying two tones having the greatest magnitude relative to the nine tones.

* * * * *